Figure 2:
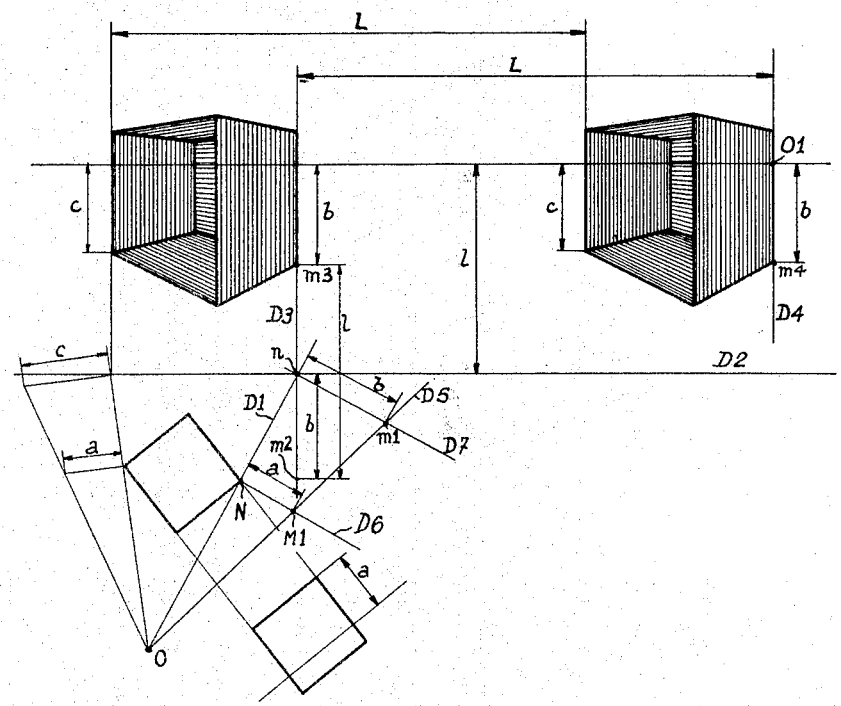

Jan. 4, 1966     J. TAVERNIER     3,226,831
PERSPECTIVE DRAFTING INSTRUMENT
Filed Oct. 28, 1963     2 Sheets-Sheet 1
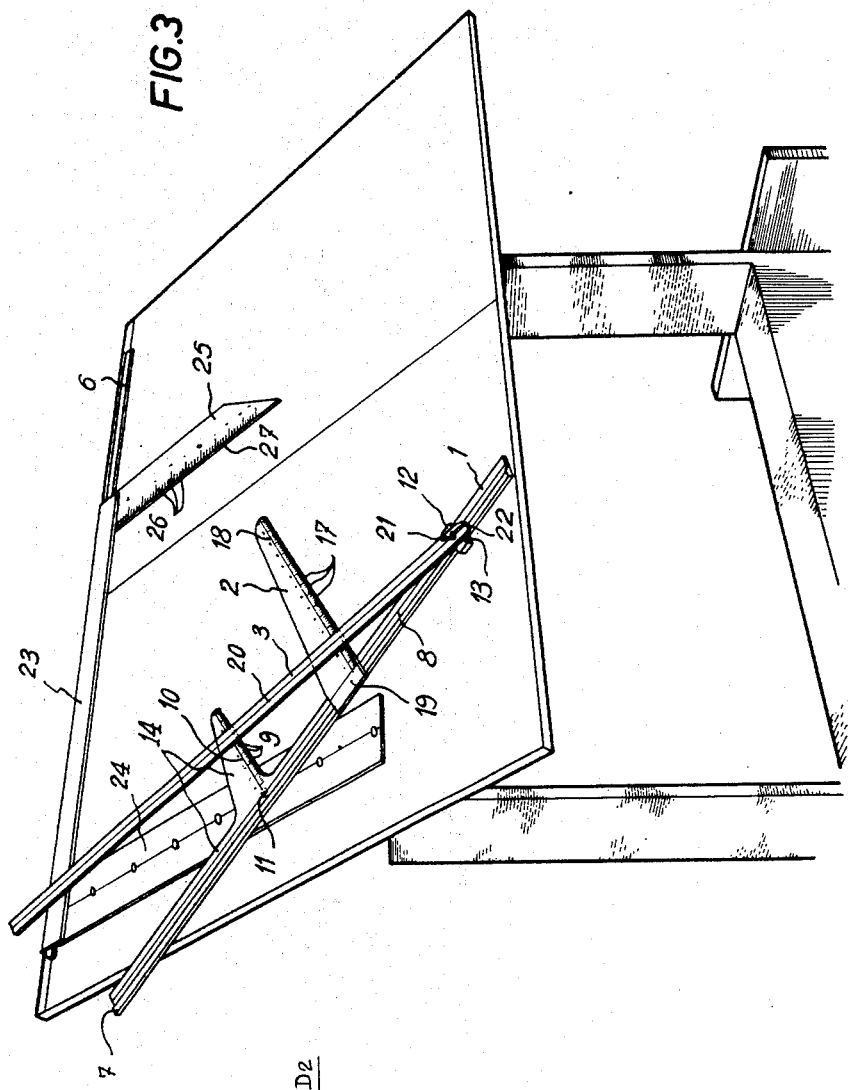
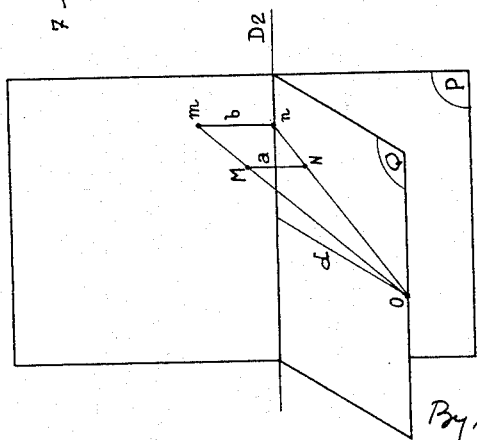
Inventor
Jean Tavernier
By Stevens, Davis, Miller & Mosher
Attorneys Jan. 4, 1966   J. TAVERNIER   3,226,831
PERSPECTIVE DRAFTING INSTRUMENT Filed Oct. 28, 1963   2 Sheets-Sheet 2

Inventor
Jean Tavernier
By Stevens Davis Miller & Mosher
Attorneys

United States Patent Office 3,226,831
Patented Jan. 4, 1966

3,226,831
PERSPECTIVE DRAFTING INSTRUMENT
Jean Tavernier, 41 Rue de Cambrai, Douai, Nord, France
Filed Oct. 28, 1963, Ser. No. 319,130
7 Claims. (Cl. 33—77)

The present invention relates to a drafting machine for making drawings of an object in conic perspective starting either from a single view dimensioned in projection, or from one plan view and one other view on which the dimensions may be read off.

It is an object of the invention to provide a drafting machine which will be simple in operation and capable of laying down perspective drawings from another view expeditiously and with a high degree of accuracy.

With this and other objects in view, the invention provides a drafting machine comprising a drafting table, a first flat strip carrying a first datum line, a first graduated scale projecting from said first flat strip and carrying a second datum line, guiding means pivotally mounted about a first pivot fixed in relation to said table, means for slidably mounting said first flat strip in said guiding means, said first flat strip thus constituting a first slide, a second flat strip carrying a second graduated scale and a third datum line, a first cursor member carrying said second flat strip, means for slidably mounting said first cursor member on said first flat strip for moving said third datum line in a direction transverse to said second datum line while maintaining said third datum line parallel to said second datum line, a third flat strip carrying a fourth datum line, and pivotally mounted on a second pivot located coaxially with said first pivot, said fourth datum line always passing through the common axis of said first and second pivots, said common axis and the zero points of said first and second graduated scales being always aligned, a second slide secured to said table, a second cursor carried by said second slide to enable said second cursor to move along said second slide, a support member carried by said second cursor, means for pivoting said first flat strip to said support member about a third pivot, and a rule carrying a third graduating scale, said rule being carried by said second cursor.

It is another object of the invention to provide a drafting instrument kit adapted to be fitted to a drafting table to form a drafting machine embodying the features enumerated and to this end, the invention provides a drafting instrument kit comprising a cursor mounted to slide along the top edge of a drafting table, limbs projecting at right angles away from said cursor in the same direction, one of said limbs carrying a first graduated scale, a first flat strip carrying a second graduated scale projecting fixedly therefrom and a third graduated scale mounted to slid along said first flat strip and projecting therefrom, said second and third graduated scales carrying data lines which are always parallel to each other, a guide member arranged for pivotal mounting on a drafting table, said first flat strip passing through said guide member in a slidable fashion, a second flat strip pivotally associated with said guide member on a pivot that is coaxial with the pivotal mounting of said guide member, and means pivoting said first flat strip to the other one of said limbs projecting away from said cursor.

Figure 4:
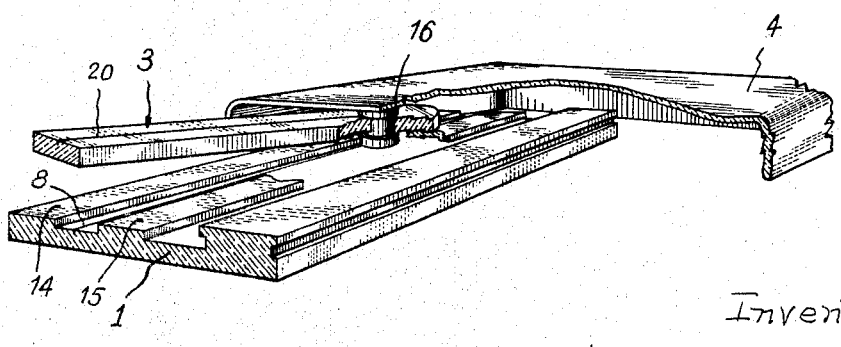

The invention will become apparent on reading the following description given with reference to the accompanying drawings, in which:

FIGURE 1 illustrates a known geometrical construction showing how the perspective of a point in space is obtained, supposing the view-point is located at a finite distance, FIGURE 2 shows a geometrical construction deduced from the construction shown in FIGURE 1, showing how it is possible, starting from the plan view of an object, to construct its perspective, FIGURE 3 shows a perspective view of one particular embodiment of instrument according to the invention, this instrument enabling drawings in conic perspective to be made by making geometrical constructions similar to those shown in FIGURE 2, and FIGURE 4 shows a perspective view of one particular embodiment of a part of the instrument.

As is known, the perspective view of an object is the conic projection of the contours or salient lines of the object viewed from a point in a plane perpendicular to the direction of sight.

Reference will first be made to FIGURE 1 to illustrate the definition of the conical projection of a point on to a plane from a centre of projection.

In FIGURE 1, the point O is the so-called "viewpoint" from which the projection is made, the plane P is the so-called "picture plane" which will contain the desired perspective view, $d$ is the distance from O to the plane P, which is the so-called "principal distance," and Q is a plane perpendicular to the plane P, containing the viewpoint O and intersecting with the plane P along a line D2, which is the so-called "horizon line."

Under these conditions, each point M in space corresponds to a point $m$ in the plane P, $m$ being the point of intersection of the line OM with the plane P, the projection of the points M and $m$ on to the plane Q being N and $n$ respectively. The height of the point M with respect to the plane Q is $a$, and that of the point $m$ is $b$. The point $m$ thus defined is the conic projection of the point M on to the plane P from the view-point O.

Reference will now be made to FIGURE 2 to show how rabatting the triangles OMN and O$mn$ on to the plane Q and rabatting the plane P on to the plane Q enable the construction described above to be converted into a construction in one plane.

FIGURE 2 shows how if the height $a$ of the point M with respect to the "horizon plane" Q is known, rabatting the triangles ONM and O$nm$ enables the height $b$ of the point $m$ with respect to the "horizon line" D2 to be determined. As the point M is known from its projection N and height $a$, $b$ is determined by drawing a line D1 passing through O and N and cutting the trace D2 of the picture plane at the point $n$. Two lines D6 and D7 are drawn perpendicular to D1, passing through the points N and $n$ respectively; a segment $NM1=a$ is marked off on the line D6; a line D5 is drawn through points M1 and O and cuts the line D7 at a point $m$1, and a segment $nm1=b$ is obtained on the line D7.

By rabatting the plane P on to the plane Q about the line D2 and by marking off a segment $nm2=b$ on the line D3 perpendicular at the point $n$ to the line D2, it is possible to effect the desired rabattement $m$2 of the image of the point M. However it will be noted that superimposition of the traces is avoided by transferring the point $m$2 both upwards to $m$3, perpendicularly to D2, by a distance $1=m2m3$, and also to the right or to the left parallel to D2 by a distance $L=m3m4$.

Reference will now be made to FIGURE 3 in order to describe the instrument according to the invention for making the constructions given above with reference to FIGURE 2.

The said instrument is attached to a drawing table, preferably in a movable manner.

A part 1, preferably made of a transparent material, is provided with a slide or slide groove 7, an engraved or ruled line 8 parallel to the slide 7, a graduated scale 9 marked off along a line 10 perpendicular to the line 8, a pivot 11, preferably made of a transparent material, its centre coinciding with the point of intersection of the line 8 with the line 10, and a slide arrangement constructed in such a manner that the line 8 passes through the point 22 which is fixed with respect to the table. The slide arrangement may be constituted e.g. as shown in FIGURE 3, viz. by a sleeve member 12 in which the part 1 slides, the said sleeve member being in turn mounted on a pivot 13, which is fixed to the table, or constituted e.g. as shown in FIGURE 4 by two rectilinear guides 14 and 15 between which a cylindrical pivot 16 of circular section, fixed to a part 4 which is attached, preferably in a movable manner, to the table, is guided.

A part 2, preferably made of a transparent material, carries a cursor 19 which allows the part 2 to the move along the slide 7 and a graduated scale 17 marked off along a line 18 perpendicular to the line 8. The zero mark on the scale 17 may be superimposed over that on the graduated scale 9 by moving the slide 19.

A part 3, preferably made of a transparent material, is proviled with an engraved or ruled line 20 and pivots about a pivot fixed in relation to the table, the centre of the pivot coinciding with the point 22 which also is fixed in relation to the table. In the embodiment illustrated in FIGURE 3, this requirement is met by pivoting the part 3 about a pivot 21 with its centre superimposed over the centre of the pivot 13, while in the alternative embodiment illustrated in FIGURE 4, the part 3 is pivoted about the pivot 16, so that in each case the line 20 always passes through the centre of the pivot 21 or of the pivot 16.

A slide 6 is attached to the table, preferably in a movable manner, and generally to the upper edge of the table.

The slide 6 forms part of a complex assembly comprising a cursor 23 movable along the slide 6 and a pivot support which is located at one of the ends of the cursor 23 and in which the pivot 11 is engaged. This pivot support may be constituted by a plate of transparent material 24 provided with one or more cylindrical holes (as shown) or with a groove to receive the pivot 11. The complex assembly also comprises a plate 25 located at the other end of the cursor 23, preferably made of a transparent material, the said plate 25 carrying a graduated scale 26 marked off along one edge 27 thereof, the said edge being perpendicular to the direction of movement of the cursor 23 along the slide 6. The said scale 26 comprises a central zero point, numbers prefixed by a + sign (positive numbers) towards the top, and numbers prefixed by a — sign (negative numbers) towards the bottom.

The way in which the instrument described above is to be used will now be explained.

Turning to FIGURE 2, it will immediately be seen that the centre of the pivots 13 and 21 or 16 corresponds to the view-point O, that the lines D1, D5, D6 and D7 correspond to the lines 8, 20, 18 and 10 respectively, and that the line D4 corresponds to the edge 27.

A plan view of the object it is desired to draw in perspective is placed on the table, the view-point being positioned so that it coincides with the axis of the pivots 13 and 21 or 16, and the sight-line being perpendicular to the direction of movement of the slide 6. The cursor 23 is moved so that the line 8 arrives over the projection N of the or any point M it is desired to draw in perspective, and then the cursor 19 is moved so that the line 18 also arrives over the point N. By pivoting the part 3 about the pivot 21 or 16 the line 20 is then made to arrive over the point on the scale 17 giving the height of the point M with respect to the "horizon plane" parallel to the projection plane and passing through O. The line 20 then cuts the line 10 at a point corresponding to a certain number on the scale 9 and the point in perspective is located at the point on the edge 27 corresponding to the same number on the scale 26 prefixed by a + sign if the point is above the horizon plane and by a — sign if the point is below the horizon plane. These operations are carried out successively for each point of the plan view required, so as to give the perspective view. For example a whole figure can be transferred from plan to perspective by plotting only the corners or other salient points.

I claim:

1. A drafting machine comprising a drafting table, a first flat strip carrying a first datum line, a first graduated scale projecting from said first flat strip and carrying a second datum line, guiding means pivotally mounted about a first pivot fixed in relation to said table, means for slidably mounting said first flat strip in said guiding means, said first flat strip thus constituting a first slide, a second flat strip carrying a second graduated scale and a third datum line, a first cursor member carrying said second flat strip, means for slidably mounting said first cursor member on said first flat strip for moving said third datum line in to said second datum line while maintaining said third datum line parallel to said second datum line, a third flat strip carrying a fourth datum line and pivotally mounted on a second pivot located coaxially with said first pivot, said fourth datum line always passing through the common axis of said first and second pivots, said common axis and the zero points of said first and second graduated scales being always aligned, a second slide secured to said table, a second cursor carried by said second slide to enable said second cursor to move along said second slide, a support member carried by said second cursor, means for pivoting said first flat strip to said support member about a third pivot, and a rule carrying a third graduated scale, said rule being carried by said second cursor.

2. A drafting machine as claimed in claim 1, wherein said first flat strip carries a pivot pin constituting said third pivot and wherein said support member has a plurality of sockets for selectively receiving said pivot pin.

A drafting instrument kit comprising a cursor mounted to slide along the top edge of a drafting table, limbs projecting at right angles away from said cursor in the same direction, one of said limbs carrying a first graduated scale, a first flat strip carrying a second graduated scale projecting fixedly therefrom and a third graduated scale mounted to slide along said first flat strip and projecting therefrom, said second and third graduated scales carrying data lines which are always parallel to each other, a guide member arranged for pivotal mounting on a drafting table, said first flat strip passing through said guide member in a slidable fashion, a second flat strip pivotally associated with said guide member on a pivot that is coaxial with the pivotal mounting of said guide member, and means pivoting said first flat strip to the other one of said limbs projecting away from said cursor.

4. A drafting instrument kit as claimed in claim 3, wherein said other one of said limbs carries a plurality of sockets and wherein said first flat strip carries a pivot pin selectively receivable in one of said sockets.

5. A drafting machine comprising a drafting table, a first flat strip having one fixed projection and one projection slidable longitudinally of the first flat strip, both of said projections having graduated scales along datum lines projecting from said first flat strip, said datum lines remaining always parallel, guide means pivoted to said table and adapted slidably to receive said first flat strip, a second flat strip pivotally mounted for independent rotation about the pivot point of said guide means, said second flat strip having a further datum line passing through said pivot point, strip means mounted on said drafting table to slide reciprocally thereon in one direction, said strip means having a graduated scale along a last datum line extending normally to said one direction, said first flat strip being pivoted to said strip means.

6. A drafting machine as claimed in claim 5, in which the two projections on the first flat strip extend in the same direction from the first flat strip and are both on the same side of said pivot point, and in which the graduated scales of said two projections have zero points which remain always aligned with said pivot point.

7. A drafting machine as claimed in claim 5, in which means are provided by which said first flat strip can be selectively pivoted to said strip means at a plurality of different points at vary distances from the pivot point of the guide means.

References Cited by the Examiner

UNITED STATES PATENTS 1,986,625   1/1935   Lorenzi _____ 33—77

FOREIGN PATENTS 299,393   8/1954   Switzerland.

ISAAC LISANN, *Primary Examiner.*